3,129,184
METHOD FOR PRODUCING NON-METALLIC MAGNETIC MATERIALS

Christopher Nigel Kenney and Raymond Spencer Thornhill, Northwich, England, assignors to Imperial Chemical Industries Limited, London, England, a corporation of Great Britain
No Drawing. Filed May 25, 1961, Ser. No. 112,535
Claims priority, application Great Britain May 31, 1960
4 Claims. (Cl. 252—62.5)

This invention relates to an improved process for the manufacture of non-metallic magnetic materials known collectively as ferrites, and having the general empirical formula $$xMO.yM'O.zM''O.Fe_2O_3$$

wherein M, M', and M'' are divalent metals, such for example as magnesium, zinc, barium, manganese, nickel, cobalt, and $x$, $y$ and $z$ have any value including zero but are such that $(x+y+z)$ is between 0 and 2.

In British Patent No. 793,870 we have disclosed and claimed a hydrothermal process for making ferrites characterised in that the component oxides, or derivatives thereof such as carbonates and hydroxides, are caused to react together by heating under pressure with water or steam at temperatures above 100° C.

In the examples illustrating the invention of British Patent No. 793,870 the oxide of iron used is ferric oxide $Fe_2O_3$. We have now found that ferrites having much improved magnetic properties compared with those made with ferric oxide are obtained by using in the said hydrothermal process a particular oxide of iron namely the hydroxy-oxide known as goethite and defined as $$\alpha\text{-FeO(OH)}$$

According to the present invention therefore a process for making compounds of the general formula $$xMO.yM'O.zM''O.Fe_2O_3$$

wherein M, M', M'' represent divalent metals, and O is oxygen, and $x$, $y$ and $z$ may have any value including zero but are such that their sum lies between 0 and 2, by mixing the component oxides, or derivatives thereof such as carbonates and hydroxides, and heating the mixture under superatmospheric pressure with water or steam at temperatures above 100° C. is characterised in that the oxide of iron is the hydroxy-oxide defined as $\alpha$-FeO(OH).

Iron forms three hydroxy-oxides namely $\alpha$-FeO(OH) known as geothite, $\beta$-FeO(OH) known as lepidocrocite, and $\delta$-FeO(OH). They lose water at relatively low temperatures within the range 100°–250° C. through the transformation of $\alpha$-FeO(OH) to $Fe_2O_3$ is not complete until somewhat higher temperatures. The $\beta$-hydroxy-oxide will also yield magnetic ferrites by the said hydrothermal process but the $\alpha$-hydroxy-oxide not only gives rise to ferrites having superior magnetic properties which make them commercially valuable, but does so in much higher yields. It is not known why $\alpha$-FeO(OH) behaves in this way; it is possible that its superior ability to absorb other ions has a bearing on the matter. Thus, if $\alpha$-FeO(OH) is stirred in a solution of barium hydroxide it removes nearly twice as much barium from solution as $Fe_2O_3$ does under similar conditions. Another possibility is that compared with $Fe_2O_3$ the hydroxy-oxide has a less rigid internal structure, thus more readily allowing penetration of its lattice by other ionic species.

Magnetic ferrites, as is known, may have permanent or temporary magnetic properties and are described as "hard" and "soft" ferrites respectively. Both kinds can be made in good yield by using $\alpha$-FeO(OH) in the hydrothermal process. Barium ferrite $BaO.6Fe_2O_3$ is an example of the hard ferrites so made, and nickel/zinc, nickel/zinc/manganese and magnesium/manganese ferrites of the soft type.

One way of carrying out the hydrothermal process is to mix the required dry oxides, hydroxides or carbonates, and to place the mixture in an autoclave and then to add water and thoroughly mix to a thin slurry, after which the autoclave is closed and the temperature raised to a value within the range 100°–400° C., preferably 300°–350°, and kept ther for several hours, for example 4 to 20. In another way soluble salts of the metals, other than iron, whose oxides are to react to form the ferrite may be added to the autoclave together with the $\alpha$-FeO(OH) and slurried with a dilute solution of caustic soda whereby the corresponding hydroxides are formed, after which the autoclave is closed and heated as before.

When the reaction is over the autoclave is cooled and opened and, if desired, any unreacted oxides may be separated from the ferrite either by dissolving them in a dilute mineral acid or magnetically. The ferrite is then ready for knwon shaping, firing and magnetising operaitons as desired.

The invention is illustrated by the following examples Nos. 1–4 of which show with respect to the hard ferrite, barium ferrite, the advantage to be gained by using $\alpha$-FeO(OH) in place of $Fe_2O_3$; Nos. 5 and 6 show a similar advantage in respect of a soft ferrite, nickel ferrite. The remaining examples illustrate the preparation of different ferrites.

Example 1

Ferric oxide (32.5 g) and hydrated barium hydroxide $Ba(OH)_2.8H_2O$ (11.3 g) were mixed and slurried in 30 mls. water, and then heated in an unstirrred autoclave under autogenous pressure for 4 hours at 350° C. The resulting barium ferrite powder was then mixed with a 1% solution of glycerine in methanol to serve as a binder, pelleted in a mould under a pressure of 1000 kg./sq. inch, and fired at 1250° C. for one hour. The pellet after magnetisation to saturation had a remanence value $B_r$ of 880 gauss.

Example 2

The preparation described in Example 1 was repeated except that $\alpha$-FeO(OH) (30.6 g.) was used instead of ferric oxide. The remanence value was 1550 gauss.

Example 3

The preparation described in Example 1 was repeated with 40 g. of ferric oxide, 14.7 g. of hydrated barium hydroxide and 30 mls. water, and a longer heating time in the autoclave, namely 10 hours. The remanence value was 1200 gauss.

Example 4

The preparation described in Example 3 was repeated except that $\alpha$-FeO(OH) (30.6 g.) was used instead of ferric oxide. The remanence value was 1820 gauss.

Example 5

Ferric oxide (35.3 g.) and nickel oxide (NiO) (14.7 g.) were mixed and heated in the autoclave with 35 mls. water at 350° C. for 24 hours under autogenous pressure. The nickel ferrite product, after firing at 1310° C. for 4 hours, had poor, hardly measurable magnetic properties, and X-ray crystallographic analysis showed only a trace of spinel structure.

Example 6

The preparation described in Example 5 was repeated with 35.6 g. of $\alpha$-FeO(OH) replacing the ferric oxide. The product showed a spinel structure by X-ray crystallographic analysis and had an induction value at 10 oersteds $B_s$ of 1800 gauss and a coercivity $H_c$ of 0.3 oersted.

Examples 7–12

These examples show for a given mixture of α-FeO(OH) (30.6 g.) and hydrated barium hydroxide (10.4 g.) the effects of different proportions of water and of reaction time and temperature. All the barium ferrite products after shaping in the moulds were fired at 1220–1250° C. for one hour.

| Water, mls. | Temperature, °C. | Time | Remanence, gauss |
|---|---|---|---|
| 30 | 350 | 4 hours | 2,000 |
| 60 | 350 | 4 hours | 2,250 |
| 22 | 350 | 4 hours | 1,920 |
| 22 | 300 | 4 hours | 1,830 |
| 22 | 300 | 5 days | 2,260 |
| 30 | 200 | 2 hours | 980 |

Example 13

α-FeO(OH) (35.9 g.), $MnCO_3$ (7.6 g.), ZnO (6.4 g.) and NiO (0.23 g.) were dried and well mixed, placed in an autoclave and slurried with 30 mls. water and heated under autogenous pressure for 16 hours at 350° C. 20 grams of the dry manganese/zinc/nickel ferrite product was mixed with 3 mls. polyvinyl alcohol in water as binder and shaped in a ring mould under 4000 lbs./sq. inch pressure. The ring was dried at 105° C. and then raised to 1310° C. over 4 hours in a weakly oxidising atmosphere, and kept at this temperature for one hour and then cooled over 8 hours. Its induction value $B_s$ at 10 oersteds was 2370 gauss and its coercivity $H_c$ 0.25 oersted.

Examples 14–16

In these examples the hydroxides of the metals, except of iron, were made in situ in the autoclave by the action of caustic soda on their salts. The reaction mixture consisted of α-FeO(OH) (20 g.), $Zn(NO_3)_2.6H_2O$ (13 g.), $MnCl_2.4H_2O$ (9.5 g.) and $NiSO_4.7H_2O$ (0.95 g.), and these in terms of oxides were in the same molecular ratios as in Example 13. The dry salts were mixed and placed in the autoclave, slurried with 50 mls. water and then 12 g. NaOH dissolved in 50 mls. water was added, and the mixtures heated as before but under different pressures and the products shaped and fired as in Example 13.

| Temperature, °C. | Pressure | Time, hours | $B_s$ at 10 oersteds, gauss | $H_c$, oersteds |
|---|---|---|---|---|
| 350 | 100 ats | 16 | 2,520 | 0.44 |
| 350 | 75 ats | 4 | 2,600 | 0.36 |
| 350 | autogenous | 1 | 3,020 | 0.07 |

Example 17

The reaction mixture consisted of α-FeO(OH) (27.7 g) and $MnCO_3$ (22.1 g.) and 30 mls. water and it was heated at 350° C. for 16 hours under autogenous pressure. The manganese ferrite after shaping and firing as in Example 13 had a $B_s$ value at 10 oersteds of 2360 gauss and a coercivity $H_c$ of 0.25 oersted.

Example 18

The reaction mixture consisted of α-FeO(OH) (42 g.) NiO (6.1 g.) and MnO (12.4 g.) and 80 mls. water, and it was heated at 350° C. for 24 hours under autogenous pressure. After shaping and firing as in Example 13 the nickel/zinc ferrite had a $B_s$ value at 10 oersteds of 1520 gauss and a coercivity $H_c$ of 0.25 oersted.

What we claim is:

1. A process for the manufacture of a non-metallic magnetic compound having the general formula $$xMO.yM'O.zM''O.Fe_2O_3$$

wherein M, M′, and M″ represent divalent metals selected from the group consisting of magnesium, zinc, barium, manganese, nickel, and cobalt, O is oxygen, and $x$, $y$ and $z$ are numbers such that the ratio of divalent metal to said $Fe_2O_3$ is at least in the range of 1:6 to 1:1 which comprises mixing an oxygen containing derivative of at least one of said divalent metals selected from the group consisting of the oxide, carbonate, and hydroxide derivatives thereof, with an iron oxide defined as $$\alpha\text{-FeO(OH)}$$

and heating the resulting mixture for from about 4 to about 20 hours at a pressure within the range of 10 to 100 atmospheres and a temperature within the range of 100° to 400° C. with a member of the group consisting of water and steam.

2. A process for making barium ferrite $BaO.6Fe_2O_3$ as defined in claim 1 in which a thin aqueous slurry of a mixture of the hydroxy-oxide of iron, defined as $$\alpha\text{-FeO(OH)}$$

and barium hydroxide is heated at 300°–350° C. under autogenous pressure for from 4 to 10 hours.

3. A process for making nickel/zinc/manganese ferrites as defined in claim 1 in which a thin aqueous slurry of a mixture of magnanese carbonate $MnCO_3$, zinc oxide ZnO, nickelous oxide NiO, and the hydroxy-oxide of iron α-FeO(OH) is heated at 300°–350° C. under autogenous pressure for from 4 to 20 hours.

4. A process as defined in claim 1 in which the hydroxides of the metals other than iron are made in situ in the hydrothermal reaction system by the action of caustic soda on their salts.

References Cited in the file of this patent

UNITED STATES PATENTS 2,978,414  Harz et al. _____ Apr. 4, 1961

FOREIGN PATENTS 793,870  Great Britain _____ Apr. 23, 1958